United States Patent
Kouno et al.

(10) Patent No.: US 9,649,819 B2
(45) Date of Patent: May 16, 2017

(54) TIRE MANUFACTURING METHOD USING JIG TO FIX COVERED BEAD INSIDE TIRE MOLD

(75) Inventors: Yoshihide Kouno, Kodaira (JP); Seiji Kon, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1024 days.

(21) Appl. No.: 13/638,112

(22) PCT Filed: Mar. 24, 2011

(86) PCT No.: PCT/JP2011/057244
§ 371 (c)(1),
(2), (4) Date: Sep. 28, 2012

(87) PCT Pub. No.: WO2011/122450
PCT Pub. Date: Oct. 6, 2011

(65) Prior Publication Data
US 2013/0014879 A1    Jan. 17, 2013

(30) Foreign Application Priority Data

Mar. 30, 2010 (JP) .................. 2010-079122
Mar. 30, 2010 (JP) .................. 2010-079123

(51) Int. Cl.
*B29D 30/06* (2006.01)
*B29D 30/08* (2006.01)
(Continued)

(52) U.S. Cl.
CPC .......... *B29D 30/48* (2013.01); *B29C 45/1671* (2013.01); *B29D 30/08* (2013.01);
(Continued)

(58) Field of Classification Search
CPC ....... B60C 5/01; B60C 5/007; B29D 30/0678; B29D 30/0679; B29D 2030/3207;
(Continued)

(56) References Cited

U.S. PATENT DOCUMENTS 2,860,379 A * 11/1958 Beckadolph et al. .................. B29D 30/0679
156/125 X
3,123,122 A * 3/1964 Beckadolph .............. B60C 5/01
(Continued)

FOREIGN PATENT DOCUMENTS

EP 2468531 A1 6/2012
JP 59-145130 A 8/1984
(Continued)

OTHER PUBLICATIONS

English machine translation of JP 2010-188634 A, Sep. 2, 2010.*
(Continued)

*Primary Examiner* — Adrienne C Johnstone
(74) *Attorney, Agent, or Firm* — Sughrue Mion, PLLC (57) ABSTRACT

A covered cord is formed by covering a cord with a resin material, and a covered bead is formed by welding or adhering together the resin material of the covered cord whilst shaping into a bead shape, such that resin material fills between the cord. The covered bead is placed in contact with a jig disposed inside a cavity of a tire mold for molding a tire frame member, the covered bead is fixed inside the mold, and the tire frame member is molded containing the covered bead in a tire bead portion by pouring molten resin material into the cavity.

9 Claims, 10 Drawing Sheets

(51) Int. Cl.
*B29D 30/48* (2006.01)
*B29C 70/54* (2006.01)
*B29D 30/00* (2006.01)
*B60C 5/01* (2006.01)
*B29C 45/16* (2006.01)
*B60C 15/04* (2006.01)
*B29C 45/14* (2006.01)
*B29D 30/32* (2006.01)
*B29L 30/00* (2006.01)

(52) U.S. Cl.
CPC ............... *B60C 5/01* (2013.01); *B60C 15/04* (2013.01); *B29C 45/14065* (2013.01); *B29C 45/14073* (2013.01); *B29C 70/541* (2013.01); *B29D 30/0678* (2013.01); *B29D 30/0679* (2013.01); *B29D 30/0681* (2013.01); *B29D 2030/084* (2013.01); *B29D 2030/086* (2013.01); *B29D 2030/3207* (2013.01); *B29L 2030/001* (2013.01); *B29L 2030/007* (2013.01); *Y10T 152/10819* (2015.01)

(58) Field of Classification Search
CPC ........ B29D 2030/084; B29D 2030/086; B29D 30/18; B29D 30/48; B29D 30/0606; B29D 30/0681; B29C 33/12; B29C 33/123; B29C 33/126; B29C 70/541; B29C 45/14065; B29C 45/14073; B29C 45/14081; B29C 45/1409
USPC ............. 152/452; 156/125, 136; 249/91, 96; 264/275, 278, 326, 336; 425/117
See application file for complete search history.

(56) References Cited

U.S. PATENT DOCUMENTS

| | | | | |
|---|---|---|---|---|
| 3,229,013 | A | * | 1/1966 | Newton et al. ........... 156/125 X |
| 3,381,736 | A | * | 5/1968 | Ford et al. |
| 3,386,485 | A | * | 6/1968 | Harrison et al. .............. 152/452 |
| 3,472,715 | A | | 10/1969 | Weinbrenner et al. |
| 3,945,420 | A | | 3/1976 | Gorter et al. |
| 3,956,448 | A | * | 5/1976 | Larson .......................... 156/125 |
| 4,090,547 | A | * | 5/1978 | Schmidt ........................ 152/452 |
| 4,253,513 | A | * | 3/1981 | Larson et al. ................. 152/452 |
| 4,277,295 | A | * | 7/1981 | Schmidt et al. .......... 156/125 X |
| 4,476,908 | A | * | 10/1984 | Cesar et al. .............. 152/452 X |
| 4,562,031 | A | * | 12/1985 | Rossi ............................ 264/255 |
| 4,860,810 | A | * | 8/1989 | Lacour .......................... 152/540 |
| 6,165,397 | A | | 12/2000 | Panaroni et al. |
| 2005/0098921 | A1 | | 5/2005 | Endo et al. |
| 2012/0152428 | A1 | | 6/2012 | Kouno et al. |
| 2016/0068028 | A1 | | 3/2016 | Kouno et al. |

FOREIGN PATENT DOCUMENTS

| | | | |
|---|---|---|---|
| JP | 5-116504 A | | 5/1993 |
| JP | 7-40715 A | | 2/1995 |
| JP | 08-175127 A | * | 7/1996 |
| JP | 8-175127 A | | 7/1996 |
| JP | 2005-143610 A | | 6/2005 |
| JP | 2007-44921 A | | 2/2007 |
| JP | 2010188634 A | * | 9/2010 |

OTHER PUBLICATIONS

Extended European Search Report, dated Aug. 5, 2013, issued in corresponding European Patent Application No. 11762681.2.
International Search Report for PCT/JP2011/057244 dated Apr. 26, 2011 English Translation.

* cited by examiner

FIG.9

TIRE MANUFACTURING METHOD USING JIG TO FIX COVERED BEAD INSIDE TIRE MOLD

CROSS REFERENCE TO RELATED APPLICATIONS

This application is a National Stage of International Application No. PCT/JP2011/057244 filed Mar. 24, 2011, claiming priority based on Japanese Patent Application Nos. 2010-079122 filed Mar. 30, 2010 and 2010-079123 filed Mar. 30, 2010, the contents of all of which are incorporated herein by reference in their entirety.

TECHNICAL FIELD

The present invention relates to a tire, a tire mold, and a tire manufacturing method wherein resin material is poured into a mold to mold a tire frame member.

BACKGROUND ART

Tires molded from rubber, organic fiber material and a steel member are known. Recently, the use of resin for tires is being demanded from the perspectives of reducing weight and ease of recycling. Resin material encompasses thermoplastic resins and thermoset resins, as well as encompassing resins that undergo cross linking under heat or an electron beam and resins that harden due to thermal rearrangement.

As an example employing such a resin, Japanese Patent Application Laid-Open (JP-A) No. 05-116504 proposes forming a tire frame member wherein a bead core is covered by a thermoplastic elastomer (TPE).

DISCLOSURE OF INVENTION

Technical Problem

For the bead core in such tire frame members the use of a rubber covered strand bead core employed in known rubber tires is not preferable from the perspectives of adhesion and vulcanization. Cable bead core is therefore frequently used for the bead core. However, as well as increasing costs, with a cable bead core it is difficult for resin material to adequately enter between the cord when the tire frame member is formed from a resin material.

In consideration of the above circumstances, an object of the present invention is to provide a tire manufacturing method wherein resin material can be adequately formed between cord, a tire manufactured by this manufacturing method, and a tire mold.

Solution to Problem

A tire manufacturing method of a first aspect of the present invention includes: forming a covered cord by covering a cord with a resin material; forming a covered bead by welding or adhering together the resin material of the covered cord whilst shaping into a bead shape, such that resin material fills between the cord; putting the covered bead in contact with a jig disposed inside a cavity of a tire mold for molding a tire frame member, and fixing the covered bead inside the mold; and molding the tire frame member containing the covered bead in a tire bead portion by pouring molten resin material into the cavity.

Resin material also encompasses rubber in the present specification. The tire frame member usually has a circular ring shape (toroidal shape).

When forming the covered cord in the tire manufacturing method of the first aspect of the present invention, the covered cord is formed such that the resin material and the cord are adhered to each other. For example, the covered cord is configured by covering thermoplastic molten resin material over the outer peripheral side of the cord and solidifying the molten material by cooling to form a thermoplastic material.

The covered bead is formed by welding or adhering together and shaping the resin material of plural strand of the cords. The resin material adhered to the cords is accordingly formed in advance between the cords in the covered bead.

Note that the covered bead may be formed by winding a single strand of covered cord in a spiral pattern, or formed by employing plural strands of covered cords.

The covered bead thus formed is fixed inside the mold. Here, the jig disposed inside the cavity of the mold contacts and fixes the covered bead. The mold is then closed and the tire frame member is molded by pouring molten resin material inside the cavity. Accordingly, adequate resin material is formed between the cord in the tire frame member formed in this way.

Note that high pressure injection for injection molding may be employed for pouring in the molten resin material (for example a thermoplastic material or a thermoset material). Furthermore, the tire frame member may be formed in a tube shape, in a structure wherein the tire frame member can be inflated with air.

When thermoplastic material in a molten state (thermoplastic molten material) is employed as the molten resin material, for example a thermoplastic elastomer (TPE) or thermoplastic resin having resilience similar to rubber may be employed, however a thermoplastic elastomer is preferably poured from the considerations of resilience during running and formability during manufacture.

In a tire manufacturing method of a second aspect of the present invention a thermoplastic material is employed as the resin material. Manufacture of the tire is accordingly easy since the molten thermoplastic material is poured into the cavity and the thermoplastic material can be solidified by taking away heat through the inner wall of the cavity. Moreover, since materials can be easily recycled, effective use of resources is possible.

In a tire manufacturing method of a third aspect of the present invention, when forming the covered cord, plural strands of the cord are gathered together and covered with resin material such that the resin material fills between the strands of the cord.

The formation of gaps between the cords can accordingly be avoided even when each covered cord includes plural strands of cord.

In a tire manufacturing method of a fourth aspect of the present invention, steel cord is employed as the cord. The strength and heat resistance of the cord can accordingly be greatly increased.

In a tire manufacturing method of a fifth aspect of the present invention, when the covered bead is made to contact the jig, the covered bead is made to contact the jig from a direction that will be on a tire inner side.

In the tire manufacturing method of the fifth aspect of the present invention, a portion at the tire inner side of the tire frame member is not formed with the resin material that is poured inside the mold, due to the jig having been in contact with the covered bead. However, even at its largest such a location has no negative impact on air retention ability when fitted to a rim. The jig dimensions and shape can accordingly be configured so as to secure adequate ability to prevent damage to the thermoplastic material at the periphery of the covered bead during removal from the mold.

In a tire manufacturing method of a sixth aspect of the present invention, molten resin material is poured in from a tire bead portion side.

In the tire manufacturing method of the sixth aspect of the present invention, when molten resin material is poured in, the molten resin material passes to the tire outside of the covered bead at the position where the jig is provided. The covered bead is accordingly pressed towards the tire inside from the tire outside. The movement force received by the covered bead during pouring in can accordingly be adequately supported by the jig.

In a tire manufacturing method of a seventh aspect of the present invention plural of the jigs are disposed along a cavity circumferential direction.

The positioning precision of the covered bead can accordingly be raised.

In a tire manufacturing method of an eighth aspect of the present invention a frame portion from the tire bead portion to a tire center is formed as the tire frame member. In the tire manufacturing method of the eighth aspect of the present invention, the tire frame member configuring a tire half section is formed. The tire frame member with covered beads for forming a complete tire can accordingly be formed by joining 2 of the tire frame members at the tire center.

In a tire manufacturing method of a ninth aspect of the present invention, once the covered bead is capable of being retained by the resin material inside the cavity, the jig is retracted from the bead core to expose a covered bead portion where the jig was in contact, and the exposed covered bead portion is covered with resin material by pouring molten resin material inside the cavity.

In the tire manufacturing method of the ninth aspect of the present invention, molten resin material is poured into the cavity with the covered bead contacted by the jig and fixed inside the cavity.

Then, once the poured in resin material has solidified to a degree, but not entirely, such that the bead core can be retained without the jig, the jig is retracted from the bead core so as not to be in contact with the covered bead. As a result, the portion of the covered bead that the jig was in contact with is exposed inside the cavity. Molten resin material is then poured into the cavity, covering the exposed portion of the covered bead with the resin material. The tire frame member is accordingly formed in which the covered bead is not formed with an exposed portion. It is accordingly easy to secure adequate air retention ability when fitted to a rim, and moreover a tire with raised bead portion strength can be manufactured whilst suppressing displacement of the covered bead during tire molding.

Note that after the jig is removed from contact with the covered bead, it is preferable to dispose a mold portion for giving the bead portion a desired shape in place of the jig. In such cases, a structure may be employed in which such a mold portion is swapped over for the jig inside the mold, or a structure may be, employed with the jig configured from plural members with a portion of the jig configuring such a mold portion.

The strength of the bead portion can be raised sufficiently since the bead portion is formed with the desired shape by disposing in such a mold.

High pressure injection for injection molding may be employed for pouring in the molten resin material (for example a thermoplastic material or a thermoset material). Furthermore, the tire frame member may be formed in a tube shape, in a structure wherein the tire frame member can be inflated with air.

A thermoplastic resin, a thermoplastic elastomer (TPE) or a thermoset resin having resilience similar to rubber may for example be employed as the resin material, however a thermoplastic elastomer is preferably poured from the considerations of resilience during running and formability during manufacture.

In a tire manufacturing method of a tenth aspect of the present invention, once the covered bead is capable of being retained by the resin material, resin material is poured inside the cavity whilst the jig is being retracted from the covered bead.

Resin material can accordingly be poured in before the resin material that has already been poured in has solidified too far, in comparison to cases where resin material is poured in after the jig has been retracted. Accordingly, it is easy to fill in the gap formed by retracting the jig by press-deforming the semi-solidified resin at the periphery of the gap.

In a tire manufacturing method of an eleventh aspect of the present invention, a timing for retracting the jig from the covered bead is set based on a dimensions of the cavity, a temperature of the resin material for pouring into the cavity, and a pour flow rate of the resin material.

The advantageous effects of the first aspect of the invention can accordingly be exhibited without the need to detect factors such as the state of solidification of the poured in resin material.

In a tire manufacturing method of a twelfth aspect of the present invention the covered bead is formed with a magnetic body and the jig is magnetized.

In order to magnetize the jig, the jig may be formed from a magnet, or magnetic flux lines may be made to act through the jig by for example a magnet outside of the jig.

According to the tire manufacturing method of the twelfth aspect of the present invention, the covered bead can easily be retained by the jig. The jig can also be moved easily during retraction.

A tire mold of a thirteenth aspect of the present invention includes a cavity that molds a tire frame member when molten resin material is poured in and a covered bead retaining jig that moves into and retracts from the cavity.

The tire mold of the thirteenth aspect of the present invention includes the cavity for molding the tire frame member. The jig moves into and retracts from the cavity, and the resin material is poured in with the covered bead in a state retained by the jig. Then, once the poured in molten resin has solidified to a degree, such that the covered bead can be retained without the jig, the jig is retracted from the covered bead so as to not to be in contact with the covered bead. As a result, a portion of the covered bead where the jig was in contact is exposed inside the cavity. In this state, more molten resin material is then poured into the cavity, covering the exposed portion of the covered bead with the resin material.

Accordingly, the tire frame member is formed without forming the exposed portion of the covered bead. Accordingly, a tire mold is achieved that produces a tire that can secure adequate air retention ability when fitted to a rim, and moreover suppresses displacement of the covered bead during tire molding whilst manufacturing a tire with raised bead portion strength.

After the jig is removed from contact with the covered bead, it is preferable to dispose a mold portion for giving the bead portion a desired shape in place of the jig. In such cases, a structure may be employed in which such a mold portion is swapped over for the jig inside the mold, or a structure may be employed with the jig configured from plural members with a portion of the jig configuring such a mold portion.

The strength of the bead portion can therefore be sufficiently raised.

A tire of a fourteenth aspect of the present invention includes: a covered bead formed by a covered cord that is a cord, in which a cord has been covered with a resin material, being wound round and shaped into a bead shape, the resin material of adjacent turns of the covered cord being welded or adhered together, and resin material being filled between adjacent cords; and a tire frame member including a tire bead portion, a tire side portion and a tire crown portion, with the covered bead being embedded in the tire bead portion.

In the tire of the fourteenth aspect of the present invention, the covered bead is formed by a covered cord that is a cord that has been covered with a resin material and wound round and shaped into a bead shape, with the resin material of adjacent turns of the covered cord welded or adhered together and resin material filled between adjacent cords. The covered bead is embedded in the bead portion of the tire frame member including the tire bead portion, the tire side portion and the tire crown portion. Accordingly a tire can be obtained with adequate resin material formed between cords by employing this tire frame member.

Advantageous Effects of Invention

According to the present invention, a tire manufacturing process, tire and tire mold are achieved wherein adequate resin material is formed between cords.

BEST MODE FOR CARRYING OUT THE INVENTION

First Exemplary Embodiment

Explanation follows regarding an exemplary embodiment of the present invention, using an exemplary embodiment that employs a thermoplastic material as a resin material. Note that in the present exemplary embodiment, "thermoplastic molten material" refers to thermoplastic material in a molten state, and "thermoplastic material" refers to the solid state.

Figure 3A:
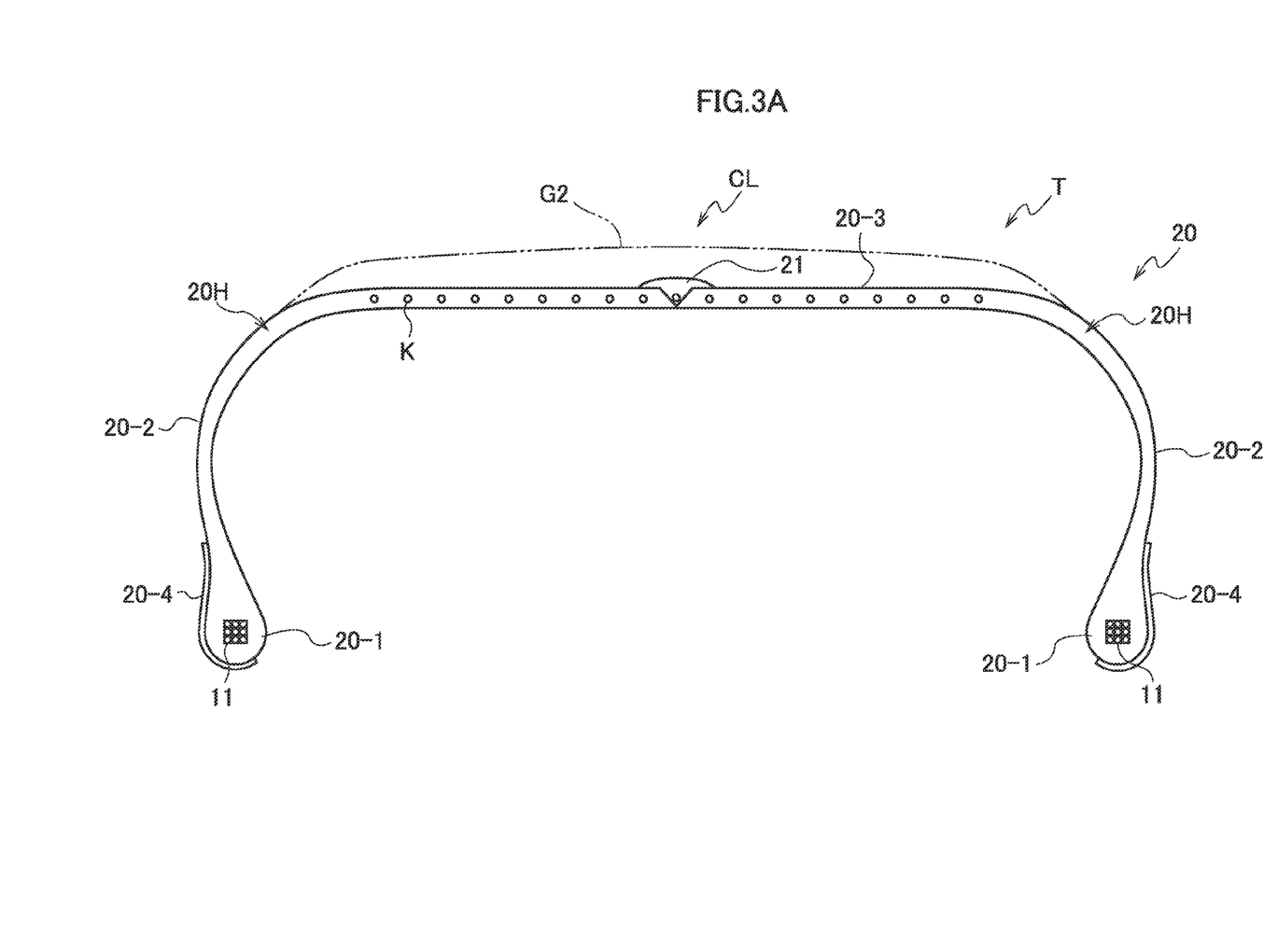
FIG. 3A is a cross-section viewed from the side illustrating a tire frame member for use in a complete pneumatic tire.
Figure 3B:
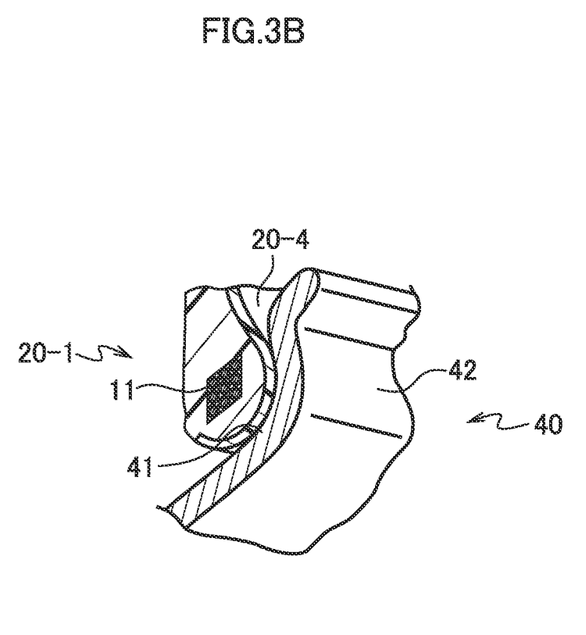
FIG. 3B is a partially expanded perspective cross-section of a pneumatic tire when mounted to a rim.

As shown in FIG. 3A, a pneumatic tire T manufactured by the tire manufacturing method of the present invention is provided with a tire frame member (tire case) 20 and chafers 20-4. The tire frame member 20 includes a pair of bead portions 20-1, side portions 20-2 that extend from the bead portions 20-1 towards the tire radial direction outside, a crown portion 20-3 that connects the tire radial direction outside end of a first of the side portions 20-2 to the tire radial direction outside end of the other of the side portions 20-2. The chafers 20-4 are formed to the front (outer) face side of the bead portions 20-1. As shown in FIG. 3B, the bead portions 20-1 are configured so as to form a tight seal with a bead seat portion 41 and a rim flange 42 of a rim 40 when in a rim-assembled state. The tire frame member 20 is formed from a thermoplastic material.

Figure 1A:
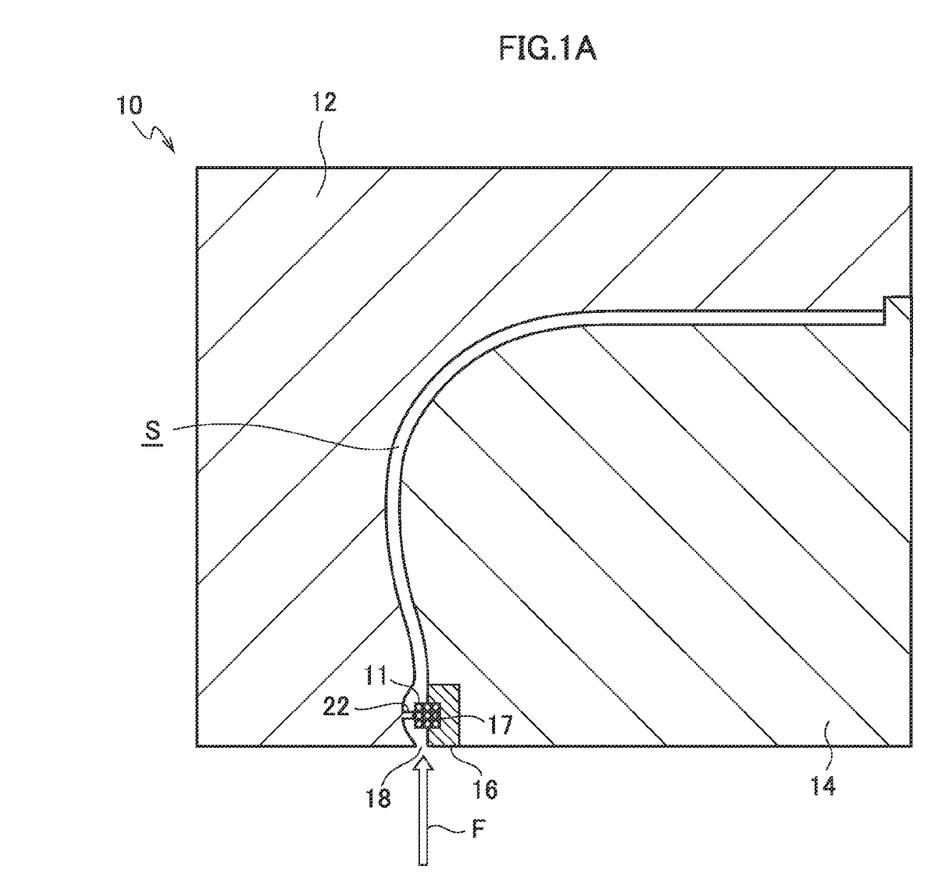
FIG. 1A is a flat plane cross-section at a position provided with a jig that contacts a covered bead from the inside in a mold employed in a first exemplary embodiment.

In the present exemplary embodiment, a mold 10 (a tire mold) such as shown in FIG. 1A is employed. As shown in FIG. 3A, the mold 10 molds a tire half body 20H configuring the tire frame member 20 from the bead portion 20-11 to a tire center CL, with the tire frame member 20 being divided into two along the tire center CL. The mold 10 includes an outer mold 12 for forming the tire outside face and an inner mold 14 for forming the tire inside face. The inner mold 14 is provided with main jigs 16 for fixing a covered bead. A cavity S (void) in the shape of the tire frame member 20 is formed between the outer mold 12 and the inner mold 14. The outer mold 12 is provided with auxiliary jigs 22 for fixing a covered bead.

Plural of the main jigs 16 are disposed at equal separations along the accommodation position of a covered bead 11. In the present exemplary embodiment, explanation is given of an example in which 12 of the main jigs 16 are provided at equal separations along the accommodation position of the covered bead 11.

A recess portion 17 having the same shape as the external shape of the portion of the covered bead 11 to be entered into the recess portion 17, described later, is formed in each of the main jigs 16. A portion of the covered bead 11 enters into the recess portion 17 when the covered bead 11 is disposed inside the mold 10, such that the covered bead 11 is in a retained state. As a result the covered bead 11 is in a state in which movement towards the tire inside direction is restricted, and movement in the up-down directions (the tire radial direction) is also restricted.

Figure 1B:
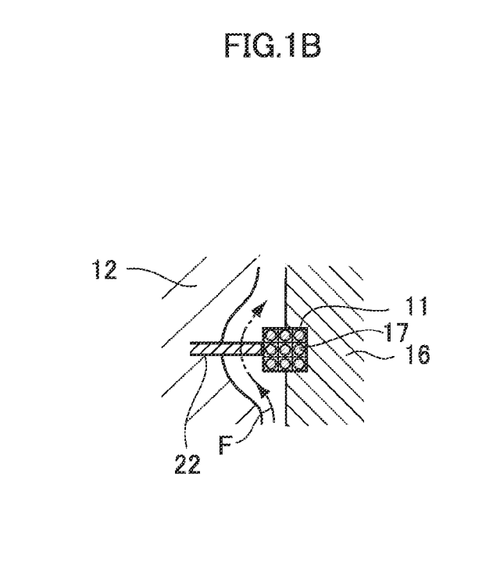
FIG. 1B is a partially expanded cross-section of a position provided with an auxiliary jig that contacts a covered bead from the outside in a mold employed in the first exemplary embodiment.

The auxiliary jigs 22 support the covered bead 11 from the tire outside. The auxiliary jigs 22 are provided at positions corresponding to the main jigs 16 and support the covered bead 11 by pinning the covered bead 11 between the main jigs 16 and the auxiliary jigs 22. Note that the auxiliary jigs 22 may also be provided to support the covered beads 11 at portions not corresponding to the main jigs 16.

A gate (resin pouring path) 18 of the mold 10 is formed such that thermoplastic molten material passes to the tire outside of the covered bead 11 with the covered bead 11 in an inserted state in the recess portion 17. The molten material is for example a thermoplastic elastomer (TPE) or a thermoplastic resin in a molten state.

The gate 18 is a disk gate with a ring shaped opening, and the cavity S is formed in communication with the ring shaped gate 18, widening into a hollow circular disk shape. The gate 18 may be configured as pin gates, however a disk gate is preferable from the perspective of formability.

In the present exemplary embodiment, the covered bead 11 is disposed at a specific position inside the mold 10, and a tire half body 20H (see FIG. 3A) configuring a first side tire half section is formed by pouring in the thermoplastic molten material (usually a molten thermoplastic polymer material).

As shown in FIG. 3A, the first side tire half body 20H and a second side tire half body 20H are joined at the tire center CL to form the tire frame member 20 for use in a complete tire.

A steel cord K serving as reinforcement of the crown portion 20-3 is spirally wound in the tire circumferential direction, increasing the rigidity in the circumferential direction. The steel cord K may also be embedded in the tire frame member 20. The chafers 20-4 are adhered at locations that fit together with a wheel (rim flanges), increasing rim-fitability. A rubber material (tread rubber G2) is adhered at locations that contact the road surface, increasing abrasion resistance characteristics and damage resistance characteristics.

Explanation follows regarding a molding method wherein the covered bead 11 is manufactured and placed inside the mold 10, and the thermoplastic molten material is injection molded to mold the tire half body 20H. Note that in the present exemplary embodiment explanation is given of injection molding, however thermoplastic material (thermoplastic resin) may be molded by simply pouring in the thermoplastic molten material.

Figure 2:
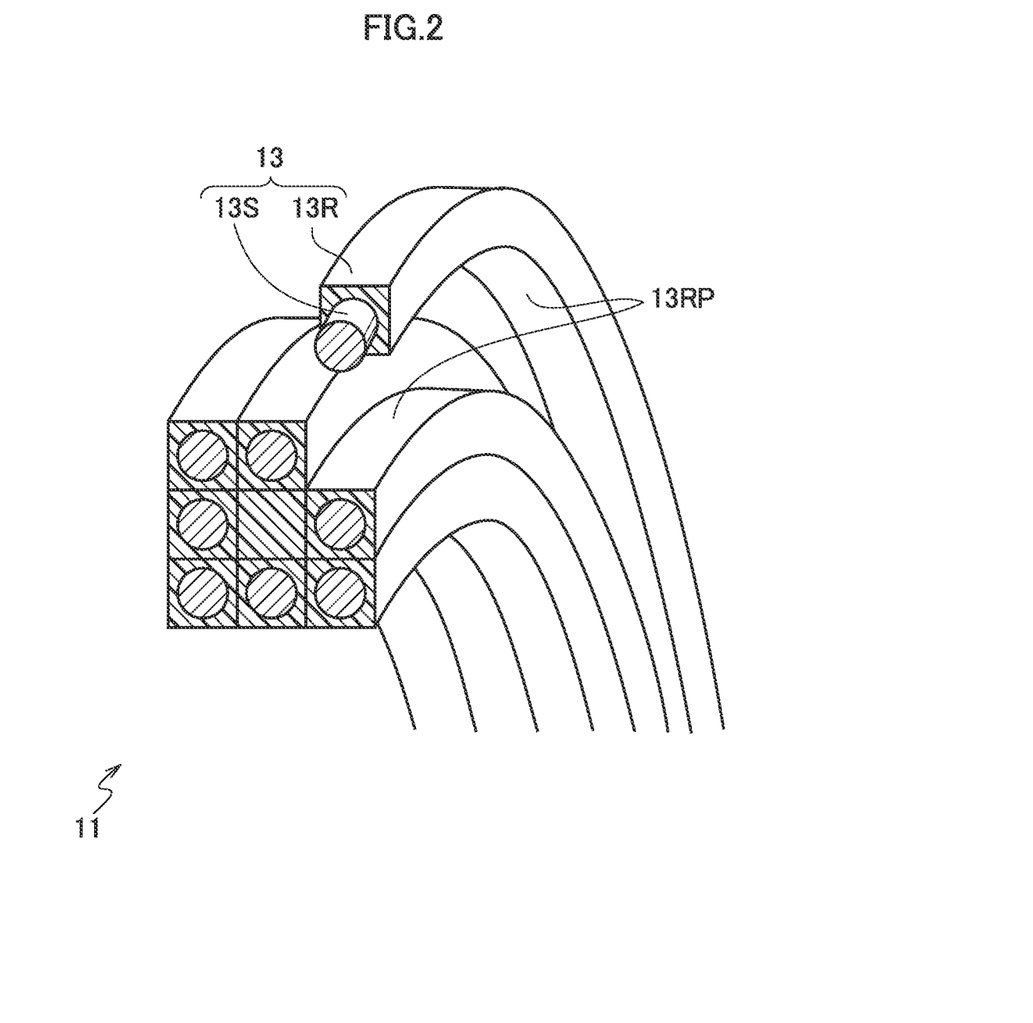
FIG. 2 is a perspective view illustrating a covered bead formed by thermally welding together covering resin of adjacent covered steel cords in the first exemplary embodiment.

As shown in FIG. 2, in the present exemplary embodiment firstly several strands of covered steel cord 13 are manufactured by covering steel cord 13S with a thermoplastic resin. In the covered steel cord 13 the outer periphery of each of the steel cords 13S is completely covered by covering resin 13R. The steel cord 13S is for example configured from a metal mono-filament or twisted metal strands.

Figure 4:
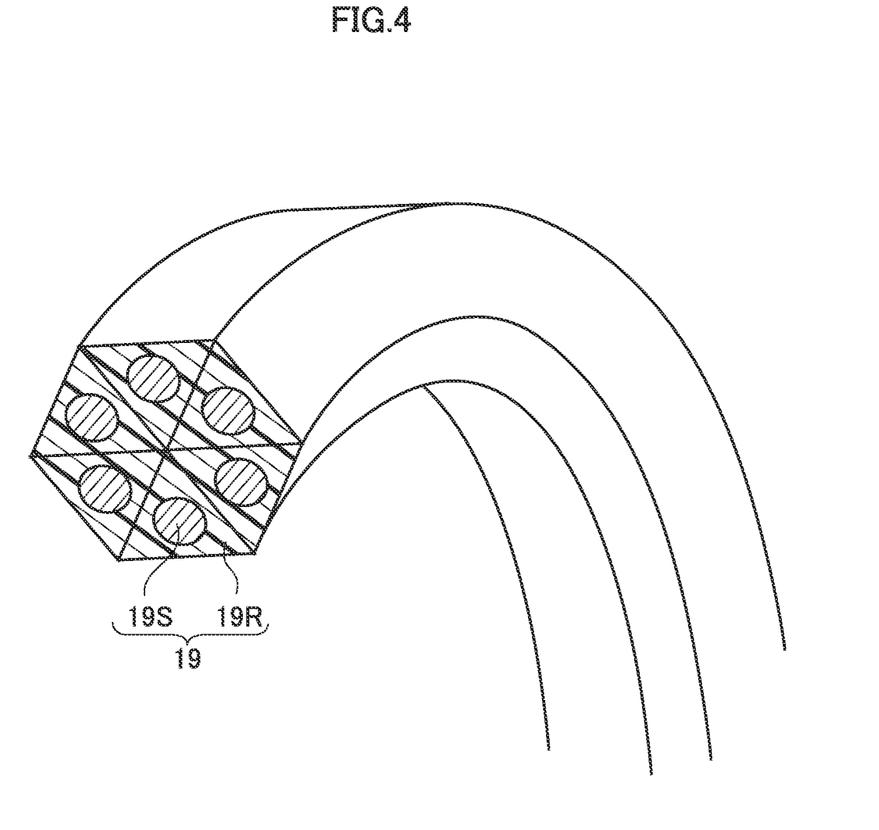
FIG. 4 is a perspective view illustrating a modified example of a covered bead formed by thermally welding together covering resin of adjacent covered steel cords in the first exemplary embodiment.

To form such covering resin 13R around the steel cords 13S, for example a thermoplastic molten material is covered over the outer peripheral side of steel cord, and the molten material solidifies through cooling to give a thermoplastic material configuring the covered steel cord. An extruder may also be employed. When extruded from an extruder, the external shape of the resin is not particularly limited, and may be circular or triangular (see for example, covered steel cords 19 each configured from a steel cord 19S and covering resin 19R such as shown in FIG. 4), quadrilateral (for example rectangular or rhomboid), or may be a chamfered shape.

Prior to covering, it is preferable to perform adhesion treatment to get the metal and the covering resin 13R to adhere to each other. Specifically, a silane coupling agent may be coated extremely thinly. From the perspective of adhesion, it is even more preferable to perform degreasing treatment prior to the adhesion treatment.

As shown in FIG. 2, the manufactured covered steel cord 13 is then wound once or more around a winding jig, and adjacent covered resin portions 13RP of the covered steel cord portions are thermally welded together to form the covered bead 11 (for example, a strand bead or mono-strand bead covered by a resin).

The wound-onto side of the winding jig is configured with the same dimensions as the inner periphery of the covered bead 11. The number of times of winding is preferably 2 times or more from the perspective of strong stabilization. If the number of times of winding is 1, it is preferable to have an overlap portion of 10 mm or more at the beginning and end of the wind. This is due to the consideration that the adhesive force of the thermally welded covered resin portions 13RP would be weak and liable to come apart during injection molding with an overlap portion under 10 mm.

During thermal welding, thermal welding may be performed by melting the covered resin portions 13RP with hot air and re-solidifying, or melting the covered resin portions 13RP through contact with the hot end of an iron and re-solidifying. The covered resin portions 13RP may also be touched by an iron whilst hot air is being blown.

The covering resin 13R is preferably the same type of thermoplastic resin as that configuring the tire frame member 20, described later. However the covering resin 13R may be a different type of resin as long as it is a resin that adheres to the thermoplastic resin of the tire frame member 20. If it is a different type of resin, the Young's modulus of the covering resin 13R should preferably fall within a range of 0.05 times to 10 times that of the thermoplastic resin configuring the tire frame member 20. At 11 times or higher, there is the consideration that the rigidity of the covered bead 11 becomes too high thereby impeding assembly to the rim. At less than 0.05 times, there is the consideration that the rigidity of the covered bead 11 becomes too low, causing the covered bead 11 to be displaced easily during injection molding due to not being able to withstand the pressure of molten resin.

The mold 10 is then opened and a tire inside portion of the covered bead 11 manufactured as described above is inserted into the recess portions 17 of the main jigs 16, such that the covered bead 11 is retained by the main jigs 16. The mold 10 is then closed and the tire outside of the covered bead 11 is supported by the auxiliary jigs 22.

Thermoplastic molten resin F is then poured into the mold 10 through the gate 18 for injection molding, forming the tire half body 20H.

During injection molding, the molten resin F is poured in so as to pass from the gate 18 through between the covered bead 11 and the outer mold 12 at the positions where the main jigs 16 are provided, and the covered bead 11 is accordingly pressed towards the tire inside from the tire outside. Movement force received by the covered bead 11 can accordingly be adequately supported by the main jigs 16.

As explained above, in the present exemplary embodiment, adjacent covered resin portions of the covered steel cords 13 are thermally welded together when forming the covered bead 11. Adequate resin is accordingly formed between the cords of the covered bead 11. Adequate resin is therefore formed between the cords of the covered bead 11 in the tire half body 20H formed when the covered bead 11 is placed in the mold 10, and in the tire frame member 20 and the pneumatic tire T employing the tire half body 20H.

Each steel cord 13S of the bead portions 20-1 is covered by the covering resin 13R over the entire periphery. The steel cords 13S can accordingly be reliably prevented from rusting since no exposed portions are formed to the steel cords 13S.

The thermoplastic molten material is poured into the cavity S in a state in which the covered bead 11 is in contact with the main jigs 16 from the direction that will be on the tire inside. The thermoplastic molten material is also poured in a state in which the covered bead 11 is in contact over a very small region from the direction that will be on the tire outside with the auxiliary jigs 22 for preventing displacement of the covered bead 11.

Locations at the tire outside of the thus formed tire half body 20H where the injection molded thermoplastic material (thermoplastic resin) is not formed, due to the auxiliary jigs 22 having been in contact, are accordingly very small regions when formed. Air retention ability can accordingly be secured when fitted to a rim.

Locations at which the injection molded thermoplastic material is not formed and the covered bead 11 is exposed due to the auxiliary jigs 22 having been in contact with the covered bead 11 are formed on the tire inside of the tire frame member 20. However, during assembly to the rim, these locations are disposed further to the tire inside (on the void side that is filled with air) of portions that make close contact with the bead seat portion 41 and the rim flange 42 of the rim 40. There is accordingly no negative impact on the air retention ability when fitted to the rim. The jig dimensions and shape can accordingly be configured so as to secure adequate damage prevention ability of the thermoplastic material at the periphery of the covered bead 11 during removal from the mold, and displacement of the covered bead 11 during tire molding can be adequately suppressed.

Note that configuration may be made with a mold structure wherein the auxiliary jigs 22 are capable of moving into and retracting from the cavity, and molten resin continues to be poured in as the auxiliary jigs 22 are retracted. This allows molten resin to be poured in before molten resin that has already been poured has solidified too far. Molten resin can accordingly flow into locations at which the auxiliary jigs 22 were in contact with the covered bead 11 to form thermoplastic material. By similarly configuring the main jigs 16 to be capable of moving into and retracting from the cavity, molten resin can also flow into locations at which the main jigs 16 were in contact with the covered bead 11 to form thermoplastic material. In such cases, the timings for retraction of the auxiliary jigs 22 and/or the main jigs 16 from the covered bead 11 may be respectively preset based on the dimensions of the cavity S and the temperature of the thermoplastic molten resin for pouring into the cavity S, dispensing with the need to detect such factors as the state of solidification of the poured in molten resin.

Molten resin may be poured in without employing the auxiliary jigs 22 in cases where displacement of the covered bead 11 during pouring in of the molten resin can be adequately prevented by retaining the covered bead 11 with the main jigs 16.

Configuration is also possible wherein the main jigs 16 contact the covered bead 11 from the tire outside rather than the tire inside.

When molten resin is poured in, the molten resin is poured in between the covered bead 11 and the outer mold 12 that forms the tire outside. The covered bead 11 is therefore pressed towards the tire inside from the tire outside during pouring in. Movement force received by the covered bead 11 can accordingly be adequately supported by the main jigs 16. This advantageous effect is obtained even when high pressure injection for injection molding is employed when pouring in the molten resin.

The main jigs 16 are disposed at plural positions along the circumferential direction of the cavity S. The positioning precision of the covered bead 11 can accordingly be raised.

The tire half body 20H forms the tire frame member 20 from the bead portion B as far as the tire center CL. The tire half body 20H namely forms a half of the tire frame member 20. Accordingly, a tire frame member 20 including the covered beads for use in a complete tire can be formed by joining together two tire half sections 20H at the tire center CL. This joining is performed by a welding method employing molten resin, or a hot plate welding method. A joining member 21 for joining at the tire center CL may be formed from the same type of resin as the tire frame member 20, or may be formed from a different type of resin to the tire frame member 20.

In the present exemplary embodiment, explanation has been given in which a tire half body 20H forming half of the tire frame member 20 is formed. However the present invention is not limited thereto and a tire frame member may be formed in a tube shape, in a structure wherein the tire frame member can be inflated with air. A pair of bead portions 12, a pair of side portions 14, and a crown portion 16 may also be integrally formed.

In the present exemplary embodiment, explanation has been given in which a thermoplastic molten resin serving as the thermoplastic molten material is poured into the cavity, however a molten thermoplastic elastomer (TPE) may also be poured in.

Examples of thermoplastic elastomers include, for example, amide thermoplastic elastomers (TPA), ester thermoplastic elastomers (TPC), olefin thermoplastic elastomers (TPO), styrene thermoplastic elastomers (TPS), urethane thermoplastic elastomers (TPU), thermoplastic cross-linked rubber (TPV) or other thermoplastic elastomers (TPZ), as defined in JIS K6418. Examples of thermoplastic synthetic resins include, for example, urethane resins, olefin resins, vinyl chloride resins or polyamide resins.

Further examples of materials that can be employed as such thermoplastic materials include materials with a deflection temperature under load (during loading at 0.45 MPa) of 75° C. or greater as defined by ISO75-2 or ASTM D648, tensile yield strength of 10 MPa or greater as defined by JIS K7113, tensile yield elongation of 10% or greater as similarly defined by JIS K7113, tensile break point elongation (JIS K7113) of 50% or greater as similarly defined by JIS K7113, Vicat softening temperature (method A) of 130° C. or greater as defined by JIS K7206.

Second Exemplary Embodiment

Explanation follows regarding a second exemplary embodiment of the present invention. The basic structure of a pneumatic tire T manufacture according to the present exemplary embodiment is similar to that of the first exemplary embodiment (see FIG. 3). In the present exemplary embodiment, elements similar to those of the first exemplary embodiment are illustrated appended with the same reference numerals, and detailed explanation thereof is omitted. Note that in the present exemplary embodiment a covered bead 11 may employ a covered bead similar to that described in the first exemplary embodiment, however in the interests of simplicity the covered bead 11 of the present exemplary embodiment is illustrated with a circular cross-section.

Figure 5A:
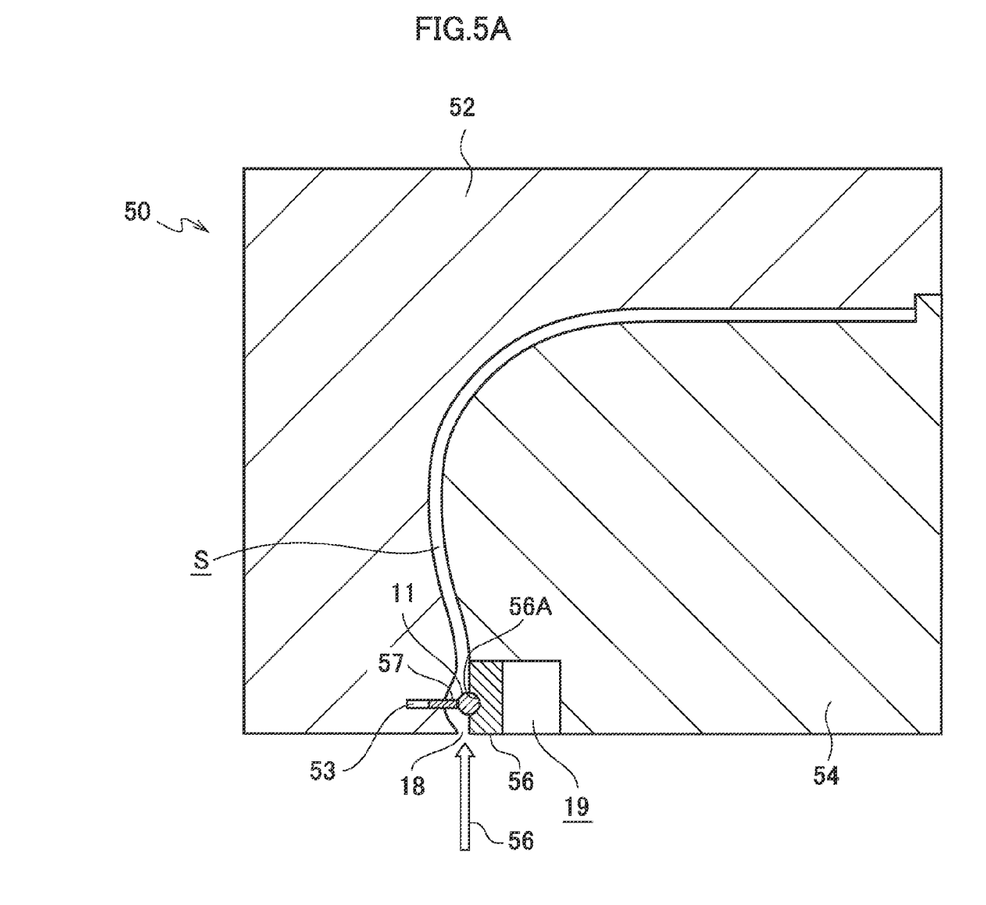
FIG. 5A is a flat plane cross-section at a position provided with a jig that contacts a bead core from the inside in a tire mold employed in a second exemplary embodiment.

A mold 50 employed in the tire manufacturing method of the present exemplary embodiment forms a tire half body 20H similarly to as in the first exemplary embodiment. As shown in FIG. 5A, the mold 50 includes an outer mold 52 for molding the tire outside and an inner mold 54 for molding the tire inside. The inner mold 54 is equipped with main jigs 56 for fixing the covered bead.

The main jigs 56 are configured with variable setting positions in an insertion-retraction direction with respect to a cavity S and also configured such that they can be swapped over to a bead portion forming mold portion 55, described later. The inner mold 54 is formed with a movement space 59 on the retraction direction side of the main jigs 56 to allow such swapping to be performed.

A recess portion 56A corresponding to the external shape of the covered bead 11 is formed in each of the main jigs 56. A portion of the covered bead 11 enters into the recess portion 56A when the covered bead 11 is disposed in the mold 50, such that the covered bead 11 is in a retained state. As a result the covered bead 11 is in a state in which movement towards the tire inside direction is restricted, and movement in the up-down directions (the tire radial direction) is also restricted.

Figure 5B:
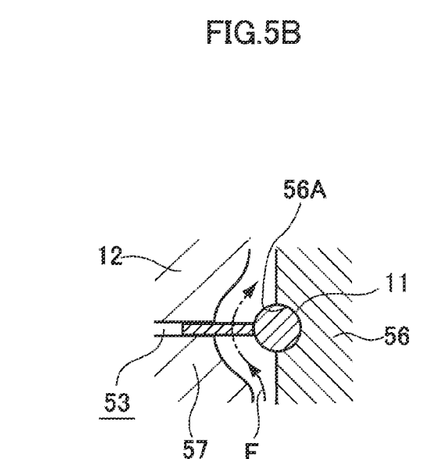
FIG. 5B is a partially expanded cross-section of a position provided with an auxiliary jig that contacts a bead core from the outside in a tire mold employed in the second exemplary embodiment.

The main jigs 56 are provided with insertable-retractable setting positions, and as shown in FIG. 5B, in an inserted position (the position protruding into the cavity S), the covered bead 11 is at a position partly entering the recess portion 56A, namely a position at which the bead core 11 can be supported from the tire inside.

Auxiliary jigs 57 with variable setting positions in the insertion-retraction directions into and away from the cavity S are provided to the mold 50 in order to further prevent displacement of the covered bead 11. The auxiliary jigs 57 are configured so as to contact the covered bead 11 at a very small region from the tire outside. Thermoplastic molten resin F can be poured into the cavity in a radiating pattern. The auxiliary jigs 52 are provided at positions corresponding to the main jigs 56 and support the covered bead 11 by pinning the covered bead 11 between the auxiliary jigs 52 and the main jigs 56. Note that the auxiliary jigs 57 may also be provided to support the covered bead 11 at portions not corresponding to the main jigs 56.

Figure 6A:
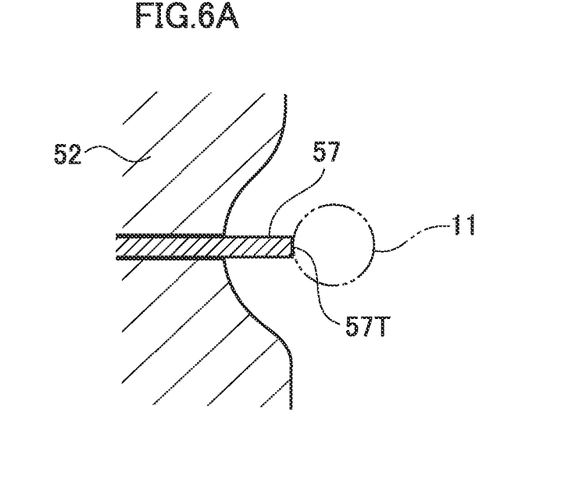
FIG. 6A is a partially expanded cross-section illustrating a state in which an auxiliary jig is in contact with a bead core in the second exemplary embodiment.
Figure 6B:
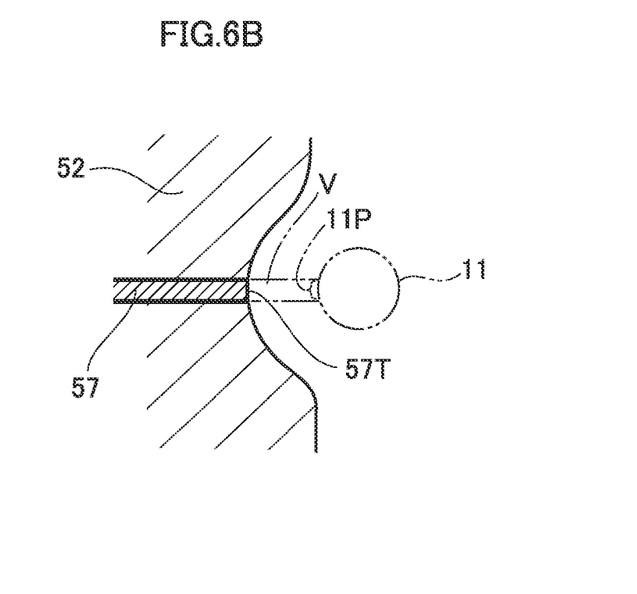
FIG. 6B is a partially expanded cross-section illustrating a state in which an auxiliary jig has been separated from a bead core in the second exemplary embodiment.

As shown in FIG. 6B, a leading end face of each auxiliary jig 57 (the contact face with the covered bead 11) 57T is in the same plane as the surrounding inner wall of the cavity when the auxiliary jig 57 is in the retracted position, and becomes a molding face for molding a bead portion 20-1 with a desired profile. In order to allow retraction of the auxiliary jigs 57, a movement space 53 is formed in the outer mold 52 on the retraction direction side of each auxiliary jig 57 (see FIG. 5A, FIG. 5B).

Figure 8:
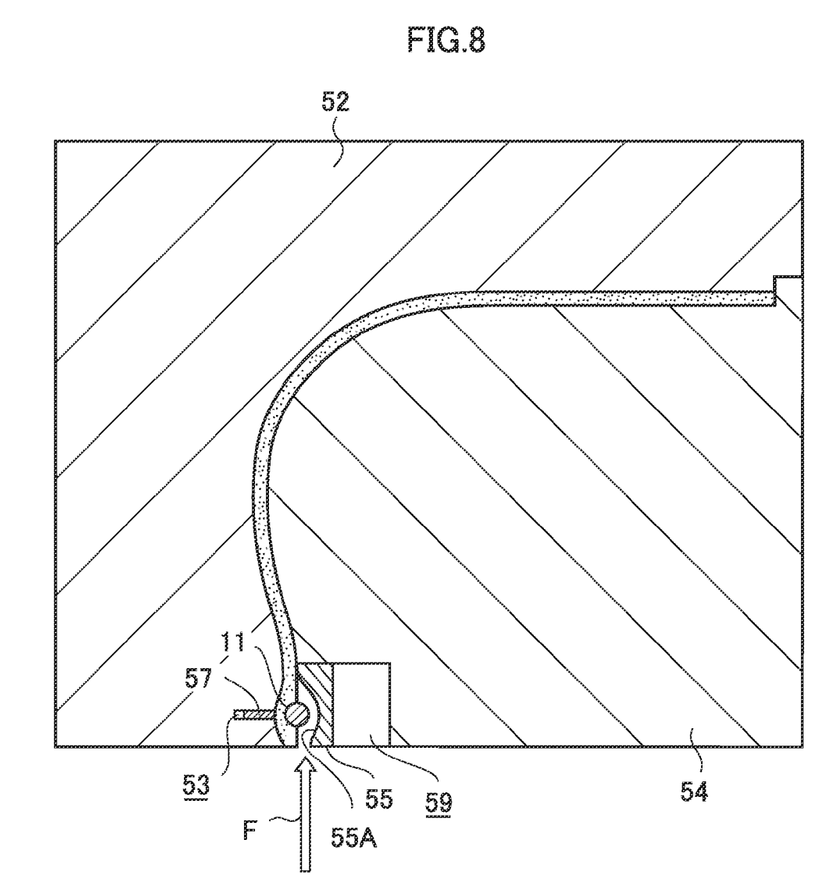
FIG. 8 is a flat plane cross-section at a position where a bead core forming mold portion is disposed in place of a jig in a tire mold employed in the second exemplary embodiment.

As shown in FIG. 8, the bead portion forming mold portions 55 are disposed in the mold 50 in place of the main jigs 56 when the main jigs 56 have been retracted. The bead portion forming mold portions 55 include a cavity inner wall face 55A with a curved concave profile following the external shape of the covered bead 11. The bead portion 20-1 (see FIG. 3) of the tire half body 20H can be molded with a desired profile by pouring in the thermoplastic molten resin F when the bead portion forming mold portions 55 have been disposed in place of the main jigs 56.

A gate (resin pouring path) 58 of the mold 50 is formed such that that molten thermoplastic polymer material passes to the tire outside of the covered bead 11 with the covered bead 11 in an inserted state in the recess portion 57. The thermoplastic polymer material is for example a thermoplastic elastomer (TPE) or a thermoplastic resin.

The gate 58 is a disk gate with a ring shaped opening, and the cavity S is formed in communication with the ring shaped gate 18, widening into a hollow circular disk shape. The gate 18 may be configured as pin gates, however a disk gate is preferable from the perspective of formability.

In the present exemplary embodiment, the covered bead 11 is disposed at a specific position inside the mold 50, and the tire half body 20H configuring a first side tire half section is molded by pouring in a thermoplastic polymer material such as a thermoplastic resin. Similarly to as in the first exemplary embodiment, the first side tire half body 20H and a second side tire half body 20H are joined at the tire center CL to form the tire frame member 20 for use in a complete tire. Reinforcement of a crown portion 20-3 with a steel cord K, formation of chafers 20-4, and formation of a tread by adhering a tread rubber G2 can be performed similarly to as in the first exemplary embodiment.

Explanation follows regarding a method of molding the tire frame member 20 in the mold 50 employing a thermoplastic resin.

Firstly, the mold 50 is opened and a tire inside portion of the covered bead 11 is inserted into the recess portions 56A of the main jigs 56, such that the covered bead 11 is retained by the main jigs 56. The mold 50 is then closed and what will become a tire outside portion of the covered bead 11 is supported by the auxiliary jigs 57.

Note that in cases where the covered bead 11 is shaped by overlapping metal cords covered with a resin, the resin covering the cords may be the same material as the thermoplastic resin employed to form the tire frame member 20, or may be a different material. Rim-fitability is not a problem even if the Young's modulus of the resin covering the cords is in a range of 0.1 to 2 times that of the thermoplastic resin employed to form the tire frame member 20.

Thermoplastic molten resin F is then poured into the cavity S of the mold 50 through the gate 58 for injection molding, forming the tire half body 20H.

During pouring in, molten resin F is poured in so as to pass from the gate 58 through into the cavity portion between the covered bead 11 and the outer mold 52 at portions of the covered bead 11 that are in contact with the main jigs 56. The covered bead 11 is accordingly pressed towards the tire inside from the tire outside. The movement force received by the covered bead 11 can accordingly be adequately supported by the main jigs 56.

In the present exemplary embodiment, once the thermoplastic molten resin F that has been poured in has solidified to a degree and is able to support the covered bead 11, first the auxiliary jigs 57 are retracted from the covered bead 11. The timing of the retraction of the auxiliary jigs 57 from the covered bead 11 is set in advance based on the dimensions of the cavity S, the temperature of the thermoplastic molten resin for pouring into the cavity S, and the pour flow rate of the molten resin F. This timing is a timing that both allows the covered bead 11 to be retained by the resin that is in a semi-solidified state and the main jigs 56 even when the auxiliary jigs 57 have separated from the covered bead 11, and also enables covered bead locations 11P that are exposed by the retraction of the auxiliary jigs 57 to be covered by resin by pouring in thermoplastic molten resin F.

The covered bead locations 11P where the auxiliary jigs 57 were in contact are exposed inside the cavity S due to retracting the auxiliary jigs 57 (see FIG. 6A, FIG. 6B). Thermoplastic molten resin F continues to be poured into the cavity S whilst the auxiliary jigs 57 are being retracted. As a result, resin that has already been poured in and is in a semi-solidified state positioned at the periphery of the auxiliary jigs 57 is pressed and deformed by molten resin being poured in, thereby continuously filling voids V (see FIG. 6B) that have been left by retracting the auxiliary jigs 57. The covered bead locations 11P are accordingly covered by molten resin, and the tire outside of the bead portion 20-1 is molded with a desired profile.

Figure 7A:
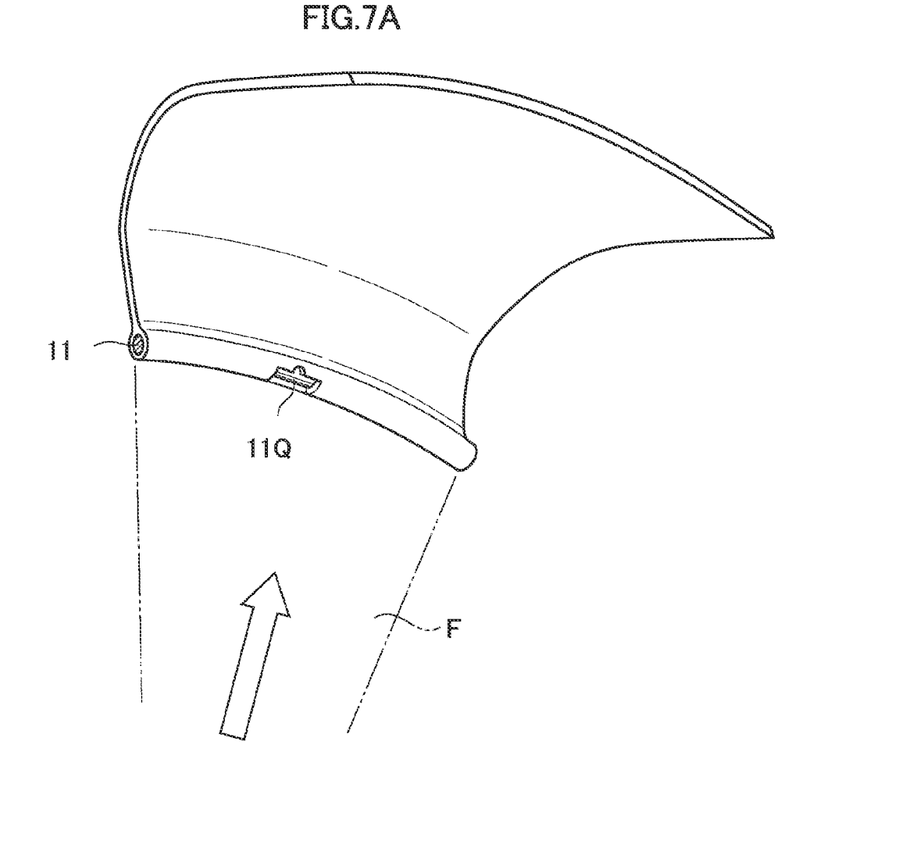
FIG. 7A is a perspective view to explain thermoplastic material poured into a cavity in a radiating pattern in the second exemplary embodiment.
Figure 7B:
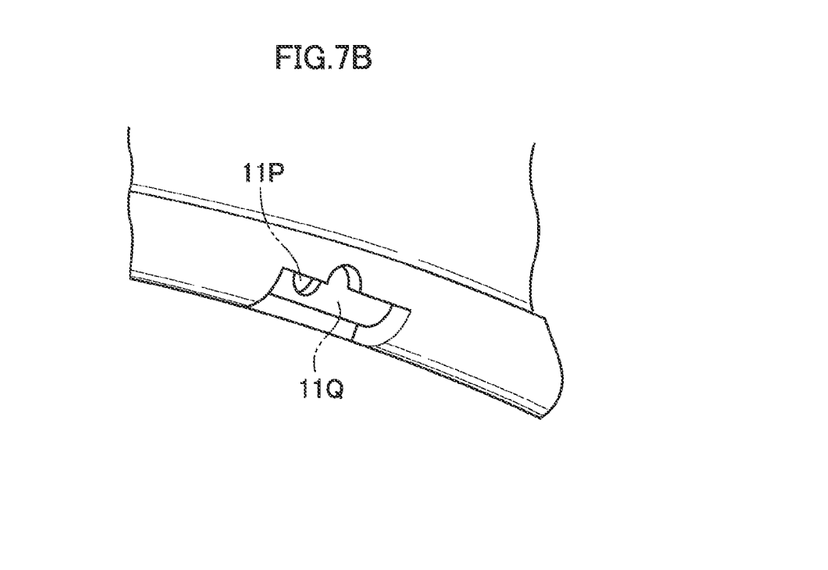
FIG. 7B is a perspective view to explain thermoplastic material poured into a cavity in a radiating pattern in the second exemplary embodiment, partially expanded and not showing the bead core of FIG. 7A.

The main jigs 56 are then retracted from the covered bead 11. In the present exemplary embodiment, the timing of the retraction of the main jigs 56 from the covered bead 11 is set in advance based on the dimensions of the cavity S, the temperature of the thermoplastic molten resin for pouring into the cavity S, and the pour flow rate of the molten resin F, similarly to with the auxiliary jigs 57. This timing is a timing that allows the covered bead 11 to be retained by solidified resin even when the main jigs 56 have separated from the covered bead 11.

Covered bead 11Q where the main jigs 56 were in contact are exposed inside the cavity S as a result of retracting the main jigs 56 (see FIG. 7A). The bead portion forming mold portions 55 are then moved inside the mold 50 until they reach a specific position in the inner mold 54. This specific position is a position where the cavity inner wall face 55A of the bead portion forming mold portion 55 can mold the bead portion 20-1 with a desired profile at the periphery of the mold inner wall face.

Figure 9:
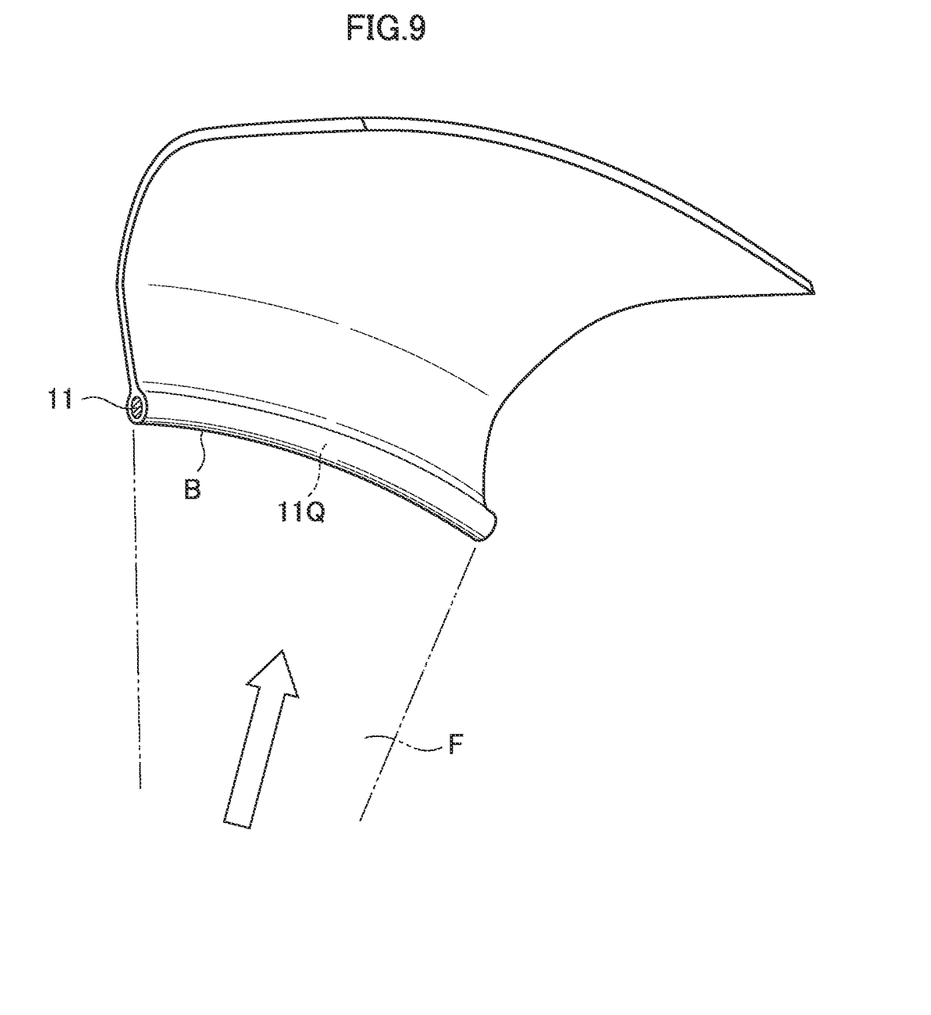
FIG. 9 is a perspective view to illustrate exposed portions of a bead core being covered by thermoplastic material in the second exemplary embodiment.

The exposed covered bead portions 11Q are covered with molten resin to form thermoplastic material (solidified resin) by pouring thermoplastic molten resin into the cavity S (see FIG. 9). The covered bead portions 11Q are accordingly covered by resin, and the tire inside of the bead portion 20-1 is molded with a desired profile.

In the thus formed tire half body 20H, the bead portion 20-1 is covered with resin around the entire circumference. It is therefore easy to secure adequate air retention ability when fitted to a rim in a pneumatic tire employing the tire half body 20H. Moreover, the strength of the bead portion 20-1 can be increased since it can bear tension around the entire circumference.

Molten resin continues to be poured in whilst the auxiliary jigs 57 are being retracted. Molten resin can accordingly be poured in before resin that has already been poured in has solidified too far in comparison to cases wherein molten resin is poured in after the auxiliary jigs 57 have been retracted. Accordingly, it is easy to fill the gaps formed by retracting the auxiliary jigs 57 by press-deforming the semi-solidified resin at the periphery into the gaps.

In the present exemplary embodiment, the timing of the retraction of the auxiliary jigs 57 and the main jigs 56 from the covered bead 11 are respectively set in advance based on the dimensions of the cavity S and the temperature of the thermoplastic molten resin for pouring into the cavity S. There is accordingly no need to detect such factors as the state of solidification of the poured in molten resin.

This advantageous effect is obtained even when high pressure injecting for injection molding is employed when pouring in the thermoplastic molten resin.

The auxiliary jigs 57 and the main jigs 56 are disposed at plural locations along the accommodation position of the covered bead 11. The positioning precision of the covered bead 11 is accordingly enhanced.

The main jigs 56 may also be formed from a magnetic material (magnet), and the covered bead 11 may be formed with a magnetic body that is attracted by magnetic force. The covered bead 11 can accordingly be easily retained by the main jigs 56, and the auxiliary jigs 57 can be moved easily even if the retaining force on the covered bead 11 of the resin in a semi-solidified state is weak when the auxiliary jigs 57 are retracted. In such cases, configuration may be made employing main jigs that are covered with a shielding member to stop magnetic force being dissipated in directions other than the direction of the covered bead 11.

When pouring in the molten resin F, the molten resin F is poured in so as to pass through into the cavity portion between the covered bead 11 and the outer mold 52 at portions of the covered bead 11 that are in contact with the main jigs 56. The movement force received by the covered bead 11 can accordingly be adequately supported by the main jigs 56 due to the covered bead 11 being pressed towards the tire inside from the tire outside during pouring in.

The tire half body 20H forms a framework section from the bead portion 20-1 to the tire center CL. Namely, a tire half section of the tire frame member 20 is formed. Accordingly, the tire frame member 20 including bead cores for use in a complete tire can be formed by joining together two tire frame members at the tire center CL. A joining member 21 for joining at the tire center CL may be formed from the same type of resin as the tire frame member 20, or may also be formed from a different type of resin to the tire frame member 20.

Note that in the present exemplary embodiment, a tube shaped tire frame member may be formed in place of the tire frame member 20, with a structure wherein the tire frame member can be inflated with air. The tire frame member 20 may also be integrally formed.

During retraction and removal of the plural auxiliary jigs 57 and plural main jigs 56 from the covered bead 11, retraction may be timed so as to be staggered in sequence to retract the auxiliary jigs 57 and the main jigs 56 in what is referred to as time-delayed retraction, further enabling the desired profile of the bead portion 20-1 to be achieved.

In the present exemplary embodiment, explanation has been given where the timings for removal of the auxiliary jigs 57 and the main jigs 56 from the covered bead 11 are set in advance based respectively on the dimensions of the cavity S, the temperature of the thermoplastic molten material for pouring into the cavity S and the pour flow rate of the molten resin. However, the timings for removal of the auxiliary jigs 57 and the main jigs 56 from the covered bead 11 may be set based on for example a temperature measured by a sensor (for example a temperature sensor for measuring the resin temperature) disposed in the mold 50.

Molten resin may be poured in without employing the auxiliary jigs 57 if displacement of the covered bead 11 during pouring in can be adequately prevented by retaining the covered bead 11 with the main jigs 56.

In the present exemplary embodiment, explanation has been given where the main jigs 56 are swapped over for bead portion forming mold portions 55 and resin is formed at the exposed covered bead portions 11Q. However the bead core portions 11Q may also be covered with resin by pouring in thermoplastic molten resin F whilst retracting the main jigs 56 from the covered bead 11.

In the present exemplary embodiment, explanation has been given wherein a thermoplastic molten resin serving as a thermoplastic material is poured into the cavity. However, a thermoplastic elastomer (TPE) may be employed.

Examples of thermoplastic elastomers that may be employed are similar to those given in the first exemplary embodiment.

Explanation has been given above of exemplary embodiments of the present invention, however the exemplary embodiments above are merely examples, and various modifications may be made within a scope not departing from the spirit of the invention. For example, explanation has been given wherein a thermoplastic material is employed for the resin material, however the resin material employed in the present invention is not limited to thermoplastic resin, and the tire may be manufactured employing thermoset resins such as urea resins, phenol resins. Obviously, the scope of rights claimed by the present invention is not limited by the exemplary embodiments described above.

The invention claimed is:

1. A tire manufacturing method comprising:
   forming a covered cord by covering a cord with resin material;
   forming a covered bead by welding or adhering together the resin material of the covered cord whilst shaping into a bead shape, such that resin material fills between the cord;
   putting the covered bead in contact with a main jig and an auxiliary jig both disposed inside a cavity of a tire mold for molding a tire frame member, and fixing the covered bead inside the mold; and
   molding a tire frame member containing the covered bead in a tire bead portion by pouring molten resin material into the cavity,
   wherein the covered bead contacts the main jig on a tire inner side,
   wherein putting the covered bead in contact with the main jig disposed inside the cavity of the tire mold comprises placing a portion of the covered bead in a recess portion of the main jig, the recess portion having the same shape as the external shape of the portion of the covered bead in the recess portion, such that the covered bead is in a retained state in which movement towards the tire inside direction is restricted and movement in the tire radial direction is restricted but movement towards the tire outside direction is not restricted,
   wherein the auxiliary jig contacts the covered bead on a tire outer side opposite to the tire inner side, and
   wherein fixing the covered bead inside the mold comprises pinning the covered bead between the main jig and the auxiliary jig.

2. The tire manufacturing method of claim 1, wherein when forming the covered cord, a plurality of strands of the cord are gathered together and covered with resin material such that the resin material fills between the strands of the cord.

3. The tire manufacturing method of claim 2, wherein the covered bead is formed by the covered cord being wound once or more around a winding jig, and thermally welding together adjacent covered resin portions of the covered cord portions.

4. The tire manufacturing method of claim 1, wherein the cord is a steel cord.

5. The tire manufacturing method of claim 1, wherein the main jig comprises a plurality of main jigs being disposed along a cavity circumferential direction.

6. The tire manufacturing method of claim 1, wherein a frame portion from the tire bead portion to a tire center is formed as the tire frame member.

7. The tire manufacturing method of claim 1, wherein the covered bead is formed with a magnetic body, and the main jig is magnetized.

8. The tire manufacturing method of claim 1, wherein the tire mold includes an outer mold for forming a tire outside face and an inner mold for forming a tire inside face, the inner mold being provided with the main jig for fixing the covered bead.

9. The tire manufacturing method of claim 8, wherein the outer mold is provided with the auxiliary jig for fixing the covered bead.

* * * * *